United States Patent [19]

Throckmorton et al.

[11] 4,168,357

[45] Sep. 18, 1979

[54] PREPARATION OF HIGH CIS-1,4-POLYPENTADIENE

[75] Inventors: Morford C. Throckmorton, Akron; Charles J. Suchma, North Royalton, both of Ohio

[73] Assignee: The Goodyear Tire & Rubber Company, Akron, Ohio

[21] Appl. No.: 893,724

[22] Filed: Apr. 5, 1978

[51] Int. Cl.$^2$ ............................. C08F 4/50; C08F 4/52
[52] U.S. Cl. ............................. 526/139; 260/33.6 A; 260/5; 526/340.2
[58] Field of Search ......................................... 526/139

[56] References Cited

U.S. PATENT DOCUMENTS

| | | | |
|---|---|---|---|
| 3,300,467 | 1/1967 | Natta et al. | 526/159 |
| 3,429,940 | 2/1969 | Wadsworth | 526/144 |
| 3,754,048 | 8/1973 | Wu et al. | 260/680 B |
| 3,804,913 | 4/1974 | Goodwin | 260/666 R |
| 4,048,418 | 9/1977 | Throckmorton | 526/138 |

OTHER PUBLICATIONS

Journ. Polym. Sci. 51, 463 (1961).
CA 80, 4644m (1974).
CA 80, 109590v (1974).

*Primary Examiner*—Stanford M. Levin
*Attorney, Agent, or Firm*—J. Y. Clowney

[57] ABSTRACT

There is disclosed a method for the preparation of very high cis-1,4-polypentadiene which comprises polymerizing cis-1,3-pentadiene, also known as cis-piperylene, with a ternary catalyst system comprising (A) a soluble chromium compound such as chromium salts of organic acids, organic complex compounds of chromium containing tridentate organic ligands, and π-bonded organochromium compounds, (B) an organometallic, such as trialkylaluminums, dialkylmagnesiums or dialkylzincs, and (C) dialkyl hydrogen phosphites.

7 Claims, No Drawings

PREPARATION OF HIGH CIS-1,4-POLYPENTADIENE

BACKGROUND OF THE INVENTION

This invention relates to a process for polymerizing cis-1,3-pentadiene to an elastomer having a very high cis-1,4-polypentadiene configuration. The polymerization is catalyzed using a mixture of (A) a soluble chromium compound, (B) organometallic compounds, such as trihydrocarbylaluminums, dihydrocarbylmagnesiums or dihydrocarbylzincs, and (C) a dihydrocarbyl hydrogen phosphite.

1,3-pentadiene monomer exists in two forms, namely, as the cis- and the trans- isomers. Each monomeric unit when polymerized contains at least one asymmetric carbon atom. There, theoretically, are 11 possible stereoregular polypentadienes.

U.S. Pat. No. 4,048,418 describes a process for polymerizing cis-1,3-pentadiene, using an iron catalyst system, to produce a polymer analyzing 93% cis-1,4-polypentadiene and which has a largely isotactic crystalline configuration; the same iron catalyst polymerizes trans-1,3-pentadiene to a syndiotactic trans-1,2-polypentadiene.

It is reported in Journ.Polym.Sci. 51, 463 (1961) that a vanadium catalyst polymerizes cis-1,3-pentadiene to isotactic trans-1,4-polypentadiene. The cis-1,3-pentadiene monomer is not polymerized by either cerium, cobalt or titanium catalysts although these catalyst systems do polymerize the trans-isomer.

U.S. Pat. No. 3,300,467 describes the polymerization of trans-1,3-pentadiene to polymers analyzing 65 to 87% cis-1,4-polypentadiene while using a titanium catalyst; and it is reported in Europ. Polym. Journ. 9, 189 (1973) that the titanium catalyst will isomerize the cis-1,3-pentadiene to trans-1,3-pentadiene and then polymerize the trans-monomer to a polymer containing 65 to 70% cis-1,4-polypentadiene.

U.S. Pat. Nos. 3,429,940 and 3,804,913 describe processes, using a ternary catalyst comprising a chromium compound, triethylaluminum and an alkyl halide, which oligomerize conjugated diolefins such as isoprene or piperylene to form cyclic trimers such as trimethylcyclododecatriene.

U.S. Pat. No. 3,754,048 describes a process that produces liquid polypentadiene while utilizing chromium acetylacetonate, a trialkylaluminum and a Schiff base as a catalyst system.

Japanese Patent No. 73 06,939 [see Chem. Abs. 80, 4644n (1974)] describes a process for polymerizing 1,3-butadiene to a polymer in which 95% of the unsaturation is 1,2-polybutadiene, while utilizing a ternary catalyst consisting of a chromium compound, an organoaluminum compound and a phosphoric acid ester.

Japanese Patent No. 73 64,178 [Chem. Abs. 80, 109590v (1974)] reports the preparation of 1,2-polybutadiene by polymerizing butadiene in the presence of hydrogen using as catalysts chromium acetylacetonate, dibutylphosphonate and triisobutylaluminum.

Thus, there is no prior art concerning the polymerization of cis-1,3-pentadiene by chromium-containing catalysts to prepare either any high cis-1,4-polydiolefins or any solid polypentadiene elastomers of any configuration.

SUMMARY OF THE INVENTION

This invention provides a process comprising the polymerization of cis-1,3-pentadiene to form high cis-1,4-polypentadiene by subjecting said cis-1,3-pentadiene to a catalyst comprising (A) at least one soluble chromium compound selected from the group consisting of chromium salts of organic acids containing from 2 to 20 carbon atoms, organic complex compounds of chromium containing tridentate ligands and π-bonded organo chromium compounds and (C) at least one phosphite compound selected from tris (2-chloroethyl)-phosphite and dialkyl hydrogen phosphites.

The high cis-1,4-polypentadiene is a high molecular weight elastomer. The polymer has a glass transition temperature of about −60° C. Its low glass transition temperature, in addition to its many other desirable physical properties, makes the high cis-1,4-polypentadiene very suitable for use in the carcasses of tires.

DETAILED DESCRIPTION OF INVENTION

The soluble chromium compound employed in the practice of this invention may be the chromium salts of carboxylic acids containing from 2 to 20 carbon atoms. The organic complex compounds of chromium containing tridentate organic ligands are also suitable. Tridentate organic ligands have three positions to which a covalent or coordinate bond with the metal may be formed. Representative of such a chromium containing tridentate compound is chromium acetylacetonate. The π-bonded organo chromium compounds represented by tris(allyl)chromium, tris(methylallyl)chromium, tris(crotyl)chromium, π-cyclopentadiene chromium tricarbonyl and π-phenyl chromium tricarbonyl may also be employed.

The preferred soluble chromium compounds useful in the invention are the chromium salts of organic acids represented by chromium octanoate, chromium benzoate, chromium naphthenate, chromium neo-decanoate, chromium oxalate and chromium stearate. Of all the soluble chromium compounds, the most preferred are chromium naphthenate, chromium neo-decanoate and chromium octanoate.

The organometallic compounds employed in this invention are aluminum trialkyls or dialkylaluminum hydrides, representative examples of which are aluminum trimethyl, aluminum triethyl, aluminum tri-n-propyl, aluminum tri-n-butyl, aluminum triisobutyl, aluminum tripentyl, aluminum trihexyl, aluminum trioctyl, diethylaluminum hydride and diisobutylaluminum hydride and the like.

The dialkyl magnesium compounds useful in this invention may be represented by di-n-hexylmagnesium and n-butylethylmagnesium and the like.

The dialkyl zinc compounds may be represented by diethylzinc and dibutylzinc and the like.

The dialkyl hydrogen phosphites may be represented by the tautomeric structures:

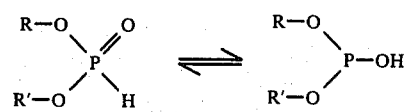

where R and R' indicate alkyl groups which may or may not be identical. The dialkyl phosphites exist substantially in the keto form (shown on the left) and are associated in dimeric or trimeric groupings by hydrogen bonding. The nomenclature dialkyl hydrogen phosphite, if applied strictly, describes only the keto tautomer, but it commonly is applied to both tautomeric forms and that is the intent herein. The phosphites of this invention may be described further as having at least one phosphinic hydrogen atom.

The dialkyl hydrogen phosphites useful in the preparation of the catalyst of this invention are those containing from 1 to 20 carbon atoms in the alkyl groups. They may be represented by dimethyl hydrogen phosphite, diethyl hydrogen phosphite, diisopropyl hydrogen phosphite, dibutyl hydrogen phosphite, bis(2-ethylhexyl)hydrogen phosphite or dioctyl hydrogen phosphite, didodecyl hydrogen phosphite, dioctadecyl hydrogen phosphite, ethyl butyl hydrogen phosphite, methyl hexyl hydrogen phosphite and the like. Cycloalkyl hydrogen phosphites, such as dicyclohexyl hydrogen phosphite, also may be used; and monoalkyl-, monoaryl hydrogen phosphites, such as ethyl phenyl hydrogen phosphite and butyl benzyl hydrogen phosphite, may also be utilized.

Tris(2-chloroethyl)phosphite is also useful in the invention.

The dialkyl hydrogen phosphites containing from 2 to 10 carbon atoms per alkyl group are the preferred phosphite containing compounds.

The catalyst system of the present invention has polymerization activity over a wide range of total catalyst concentration and catalyst component ratios. Catalyst components apparently interreact to form the active catalyst species. As a result, the optimum concentration for any one catalyst component is dependent upon the concentrations of the other catalyst components. While polymerizations will occur over a wide range of catalyst concentrations and ratios, the polymers having the most desirable properties are obtained within a narrower mole ratio range.

The molar ratio of the organometallic compound to the chromium compound (Me/Cr) can be varied from about 20:1 to about 2:1. However, a most preferred range of Me/Cr is from about 8:1 to about 4:1.

The molar ratio of the dialkyl or diaryl hydrogen phosphite to chromium compound (P/Cr) may be varied from about 0.2:1 to about 10:1 with a more preferred range of P/Cr being from about 0.5:1 to about 3:1.

Catalyst components may be charged to the polymerization system as separate catalyst components in either a step-wise or simultaneous manner, usually called "in situ" preparation. The catalyst components may also be preformed by premixing each of the three components outside of the polymerization system and the resulting premixed catalyst components added to the polymerization systems.

The amount of total catalyst employed depends on such factors as purity of the components, polymerization rate desired, and the temperature. Therefore, specific total concentrations of catalyst cannot be set forth except to say that catalytic amounts should be employed. Successful polymerizations have been made using molar ratios of monomer to the chromium component in the ternary catalyst system ranging between about 300/1 to about 4,000/1. The preferred monomer to chromium concentration generally is between 600/1 and 2,000/1. Certain specific total catalyst concentration and catalyst component ratios which produce polymers having desired properties are illustrated in the examples elsewhere in the specification.

In general, the polymerizations of this invention are carried out in inert solvent systems and are, thus, considered to be solution polymerizations. By the term "inert solvent" is meant the solvent or diluent employed does not enter into the polymer structure nor does it have an adverse effect on the catalyst activity. Examples of such solvents are usually aliphatic, aromatic or cycloaliphatic hydrocarbons. The preferred solvents are hexane, pentane, benzene, toluene and cyclohexane. The solvent/monomer volume ratio may be varied over a wide range. Up to 20 or more/1 volume ratio of solvent to monomer may be employed. It is usually preferred to employ a solvent/monomer volume ratio of about 3/1 to about 6/1. It is possible to employ a suspension polymerization system in the practice of this invention. This may be done by choosing a solvent or diluent in which the polymer formed is insoluble.

It is usually desirable for best results to conduct polymerizations of this invention by employing air-free and moisture-free techniques.

Temperatures employed in the practice of this invention are not critical and may widely vary from a low temperature, for example, such as $-10°$ C. or below to a high temperature of $100°$ C. or above. However, it is usually more desirable to employ a more convenient temperature between about $20°$ C. and about $90°$ C.

The practice of this invention is further illustrated by reference to the following examples which are intended to be representative rather than restrictive of the scope of the invention. Unless otherwise noted, all parts and percentages are by weight. The dilute solution viscosities (DSV) of the polymers have been determined in toluene at $30°$ C. The glass transition temperatures (Tg) have been determined using DuPont's Model #900 Differential Thermal Analyzer (DTA). The microstructures of the polymers were determined by a combination of Nuclear Magnetic Resonance (NMR) and Infrared (IR) techniques, as described by D. H. Beebe, et al., in Journ. Polym. Sci., Part A-1 (in press).

EXAMPLE I

A purified solution of 99 percent pure cis-1,3-pentadiene in a concentration in hexane to produce 10 grams of cis-1,3-pentadiene per hundred milliliters of total solution was charged into a series of 4-oz bottles. Catalyst components were charged by "in situ" addition in the following order: The organometallic compound, followed by the chromium compound, followed by the dialkyl phosphite compound. The specific compounds and amounts are identified in Table 1. The bottles were placed in a water bath maintained at $50°$ C. and tumbled end-over-end to provide agitation. The polymerizations were terminated by addition of 2 ml of methanol and one part per hundred of monomer (phm) of dibutyl para-cresol, and the polymers were isolated by drying under vacuum. The additional polymerization conditions and results are set forth in the Table 1 below. The species and amounts of catalyst components set forth in columns 2, 3 and 4 are reported in millimoles per hundred grams of cis-1,3-pentadiene (mhm).

Table 1

| Run No. | Catalyst, mhm R₃Al | Cr Naph | (RO)₂HPO | Pzn Time, Hours | Polymer Yield, Wt, % | DSV dl/g | Tg °C. | % cis-1,4-PPD,[3] MNR and IR Anal. |
|---|---|---|---|---|---|---|---|---|
| 1  | 15 Me[1]  | 2 | 2 Bu   | 19  | 94   | 2.9 | ND[2] | ND |
| 2  | 12 Et     | 2 | 2 Bu   | 2   | 94   | 1.3 | −61   | 97 |
| 3  | 15 Et     | 2 | 2 Bu   | 1   | 91   | 2.1 | —     | —  |
| 4  | 12 Et     | 2 | 2 Oct  | 2   | 96   | 1.7 | −60   | 95 |
| 5  | 15 Et     | 2 | 2 Oct  | 1.5 | 99   | 4.9 | —     | —  |
| 6  | 12 i-Bu   | 2 | 2 Me   | 2   | 47   | ND  | —     | —  |
| 7  | 12 i-Bu   | 2 | 2 Et   | 2   | 87   | 3.2 | —     | —  |
| 8  | 12 i-Bu   | 2 | 2 i-Pr | 19  | 99   | 5.9 | —     | —  |
| 9  | 7.5 i-Bu  | 1 | 1 Bu   | 19  | 97   | 7.5 | −59   | 96 |
| 10 | 12 i-Bu   | 2 | 2 Bu   | 2   | 78   | 5.5 | −59   | 95 |
| 11 | 7.5 i-Bu  | 1 | 1 Oct  | 19  | 95   | 8.3 | −59   | 95 |

[1]Me, Et, i-Pr, Bu, i-Bu and Oct in columns 1 and 3 represent methyl, ethyl, isopropyl, n-butyl, isobutyl and octyl, respectively.
[2]ND = Not Determined
[3]PPD = polypentadiene or polypiperylene Analyses reveal 2-3% trans-1,2 and 1-2% of 3,4-polypiperylenes also present.

EXAMPLE II

A solution comprising 200 mls of 97% cis-1,3-pentadiene in 1050 mls of n-pentane was dried by passing through a column of silica gel, and 100 ml aliquots containing 10 g of cis-1,3-pentadiene was charged to two 4-oz bottles. Catalyst components were injected "in situ", charging triethylaluminum, chromium octanoate and dibutylhydrogen phosphite in that order at concentrations of 10, 2 and 2 millimoles/100 g of monomer (mhm), respectively. The polymerization procedure was the same as that described in Example I. The polymerizations were terminated after 1.5 and 21 hours, respectively. The yields of dry solid polymers were 91 and 99.4% of theoretical, respectively. The DSV of the first polymer was 6.0 dl/g, and its Tg (as determined using a DuPont Model 990 Thermal Analyzer) was −56° C.

EXAMPLE III

A solution of 280 mls of 97% cis-1,3-pentadiene in 1520 mls of industrial grade hexane was purified, and 100 ml was charged to a 4-oz bottle.

The catalyst components were charged by the "in situ" method in the order (a) dioctyl hydrogen phosphite, (b) chromium naphthenate and (c) triisobutylaluminum at concentrations of 2, 2 and 12 mhm, respectively. The polymerization procedure was similar to that described in Example I. Polymerization was terminated after 3 hours, and the yield of elastomer was 91.6% of the theoretical. The DSV was 5.2 dl/g.

EXAMPLE IV

A solution of 2300 g of cis-1,3-pentadiene in 16,800 g of industrial grade hexane was passed through a column of silica gel and charged to a 10 gallon stirred reactor. The solution was sparged with nitrogen for two minutes to displace any dissolved air. It was heated to 50° C. and then the catalyst components were injected in situ in the following order: (a) 270 millimoles of triisobutylaluminum (TIBAL), (b) 45 millimoles of chromium naphthenate and (c) 45 millimoles of dioctyl hydrogen phosphite. After 5.67 hours, the solids content of a sample of cement from the reactor was 10.1 percent, indicating 83% conversion. The polymerization was terminated after 10 hours by adding 50 milliliters of methanol and 25 grams of dibutyl-para-cresol. The cement was dried in trays under vacuum at 40° C., and 2126 g of polymer were recovered.

The Mooney viscosity (ML-4 at 212° F.) of the polymer was 76 and the DSV was 4.0 dl/g. The number average molecular weight, as determined using a Mecrolab Model No. 501 membrane osmometer, was 210,000. The number and the weight average molecular weights, as determined using a Waters Associates Model No. 200 gel permeation chromatograph, were 188,000 and 725,000, respectively.

The microstructure of the polymer was 95% cis-1,4-, 3% trans-1,2- and 2% 3,4-polypentadiene. The Tg was −59° C.

Thirty parts of the polymer were blended with 70 parts of natural rubber and then was tested in a radial tire carcass formulation. A few of the physical properties obtained on this stock are:

Tensile strength—15 MPa
Modulus, 300%—8.8 MPa
Elongation—495%
Rebound, cold—79%
Rebound, Hot—85%

The polymer milled well, exhibited good resistance to aging, and had good adhesion characteristics.

While certain representative embodiments and details have been shown for the purpose of illustrating the invention, it will be apparent to those skilled in this art that various changes and modifications may be made therein without departing from the spirit or scope of the invention.

What is claimed is:

1. A process comprising the polymerization of cis-1,3-pentadiene to form high cis-1,4-polypentadiene elastomers by subjecting said cis-1,3-pentadiene to a catalyst comprising (A) at least one organometallic compound selected from the group consisting of aluminum trialkyls, magnesium dialkyls and zinc dialkyls, (B) at least one soluble chromium compound selected from the group consisting of chromium salts of organic acids containing from 2 to 20 carbon atoms, organic complex compounds of chromium containing tridentate ligands and π-bonded organo chromium compounds and (C) at least one phosphite compound selected from tris(2-chloroethyl)phosphite and dialkyl hydrogen phosphites in which the alkyl groups contain at least 2 and not more than 10 carbon atoms and in which the molar ratio of the organometallic compound to the chromium compound (Me/Cr) ranges from about 20/1 to about 2/1 and the phosphite member to the chromium compound (P/Cr) ranges from about 0.2/1 to about 10/1.

2. A process according to claim 1 wherein the organometallic compound is a trialkyl aluminum in which the alkyl groups contain at least 2 and not more than 6 carbon atoms.

3. A process according to claim 1 wherein the soluble chromium compound is selected from the group consisting of chromium salts of carboxylic acids and chromium acetylacetonate.

4. A process according to claim 1 in which the soluble chromium compound is selected from the group consisting of chromium decanoate, chromium naphthenate and chromium octanoate.

5. A process according to claim 1 in which the phosphite member is selected from the group consisting of diethylhydrogen phosphite, diisopropyl hydrogen phosphite, dibutyl hydrogen phosphite, dihexyl hydrogen phosphite and dioctyl hydrogen phosphite.

6. A process according to claim 1 wherein the organometallic compound is a trialkylaluminum wherein each alkyl group contains at least 2 and not more than 6 carbon atoms, the soluble chromium compound is selected from the group consisting of chromium salts of carboxylic acids and chromium acetylacetonate and the phosphite compound is a dialkyl hydrogen phosphite in which the molar ratio of the organometallic compound to the chromium compound is about 4/1 to about 8/1 and the phosphite compound to the chromium compound is from about 0.5/1 to about 3/1.

7. A process according to claim 6 wherein cis-1,3-pentadiene is polymerized to produce a stereoregular elastomer having a microstructure containing at least 95 percent cis-1,4-polypentadiene.

* * * * *